(12) United States Patent
Li et al.

(10) Patent No.: US 12,555,445 B2
(45) Date of Patent: Feb. 17, 2026

(54) TRIGGERED ITEM IDENTIFICATION

(71) Applicant: TOSHIBA GLOBAL COMMERCE SOLUTIONS, INC., Durham, NC (US)

(72) Inventors: Chia-Wei Li, New Taipei (TW); Susan W. Brosnan, Raleigh, NC (US); Wan-Chen Tsai, New Taipei (TW); Guei-Syuan Lin, Kaohsiung (TW)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 119 days.

(21) Appl. No.: 18/393,638

(22) Filed: Dec. 21, 2023

(65) Prior Publication Data
US 2025/0209894 A1 Jun. 26, 2025

(51) Int. Cl.
*G07G 1/00* (2006.01)
*G06K 7/10* (2006.01)
*G06K 7/14* (2006.01)

(52) U.S. Cl.
CPC ....... *G07G 1/0063* (2013.01); *G06K 7/10861* (2013.01); *G06K 7/1473* (2013.01)

(58) Field of Classification Search
CPC . G07G 1/0063; G06K 7/10861; G06K 7/1473
See application file for complete search history.

(56) References Cited

U.S. PATENT DOCUMENTS

| | | | |
|---|---|---|---|
| 7,909,248 B1 * | 3/2011 | Goncalves | G07G 1/0072 235/462.14 |
| 8,494,909 B2 | 7/2013 | Goncalves | |
| 8,825,531 B1 * | 9/2014 | Catoe | G07G 1/0018 705/16 |
| 11,922,268 B1 * | 3/2024 | Lupo | G06K 7/1413 |
| 12,014,544 B2 * | 6/2024 | Brakob | G06V 20/52 |
| 2004/0199427 A1 * | 10/2004 | van der Loo | G01G 19/4144 705/16 |
| 2005/0269411 A1 * | 12/2005 | Vesikivi | G06K 7/10881 235/462.01 |
| 2011/0320296 A1 * | 12/2011 | Edwards | G06Q 20/208 235/382 |

(Continued)

FOREIGN PATENT DOCUMENTS

JP        2017146986 A      8/2017

OTHER PUBLICATIONS

Wu, Bing-Fei, et al. "An intelligent self-checkout system for smart retail." 2016 International Conference on System Science and Engineering (ICSSE). IEEE, 2016. (Year: 2016).*

(Continued)

*Primary Examiner* — Nathan A Mitchell
(74) *Attorney, Agent, or Firm* — Patterson + Sheridan, LLP; Gero G. McClellan

(57) ABSTRACT

The present disclosure describes a computer system and method for motion activated item identification. The computer system includes a memory and a processor communicatively coupled to the memory. The processor detects, based on a video of a user, a motion of the user while scanning a barcode of an item and in response to determining, based on the motion of the user, that the barcode scanned incorrectly, captures an image of the item. The processor also determines, based on the image of the item, an identity of the item and adds, based on the identity of the item, the item to a checkout transaction.

17 Claims, 7 Drawing Sheets

(56) References Cited

U.S. PATENT DOCUMENTS

| | | | | |
|---|---|---|---|---|
| 2012/0321146 | A1* | 12/2012 | Kundu | G06Q 20/208 |
| | | | | 340/568.8 |
| 2018/0365544 | A1* | 12/2018 | Gao | G06K 7/1098 |
| 2019/0318417 | A1* | 10/2019 | Gumaru | G06Q 30/0635 |
| 2022/0270099 | A1* | 8/2022 | Naito | G06V 20/52 |
| 2023/0245058 | A1* | 8/2023 | Hagen | G06V 10/764 |
| | | | | 705/28 |

OTHER PUBLICATIONS

Bobbit, Russell, et al. "Visual item verification for fraud prevention in retail self-checkout." 2011 IEEE Workshop on Applications of Computer Vision (WACV). IEEE, 2011. (Year: 2011).*
U.S. Appl. No. 18/217,282, filed Jun. 30, 2023.

* cited by examiner

TRIGGERED ITEM IDENTIFICATION

BACKGROUND

The present disclosure relates to checkout systems, and more specifically, to triggered item identification for checkout systems.

DETAILED DESCRIPTION

During checkout, a user may scan a barcode on an item. The checkout system may determine the identity of the item by the scanned barcode, and the checkout system may then add the item and the price of the item to the transaction. On occasion, however, the barcode on an item may be damaged or obfuscated. For example, the packaging with the printed barcode may be folded or torn. As another example, ink or other markings may cover or distort a portion of the barcode. As a result, the checkout system may be unable to scan the barcode, which prevents the system from recognizing the item. The system may be unable to complete the transaction, or the system may delay processing the transaction.

The present disclosure describes a system that detects when a barcode scanned incorrectly and triggers an item identification system or process. The system may monitor video (e.g., using a computer vision technique) to detect when a user performs motions that indicate a barcode is scanning incorrectly. For example, the system may detect when the user has attempted to scan the same item repeatedly or when the user has turned an item over repeatedly. The system may then activate the item identification system or process. For example, the system may activate secondary cameras that capture images of the item. The system may analyze these images to identify the item. After the item is identified, the system may add the item to the transaction and deactivate the item identification system or process.

In certain embodiments, the system provides several technical advantages. For example, the system may identify automatically determine when a barcode on an item is scanning incorrectly. The system may also automatically trigger the item identification process to identify the item. In this manner, the system reduces the amount of time it takes to complete the transaction. Additionally, in some instances, items with damaged barcodes are thrown away, so the system reduces waste by identifying the item with the damaged barcode and allowing the item to be added to the transaction. Furthermore, the system may activate the item identification system or process as needed (e.g., when the system detects that a barcode scanned incorrectly), which reduces computing resource usage and power consumption, thereby improving the operation of a computer.

Figure 1:
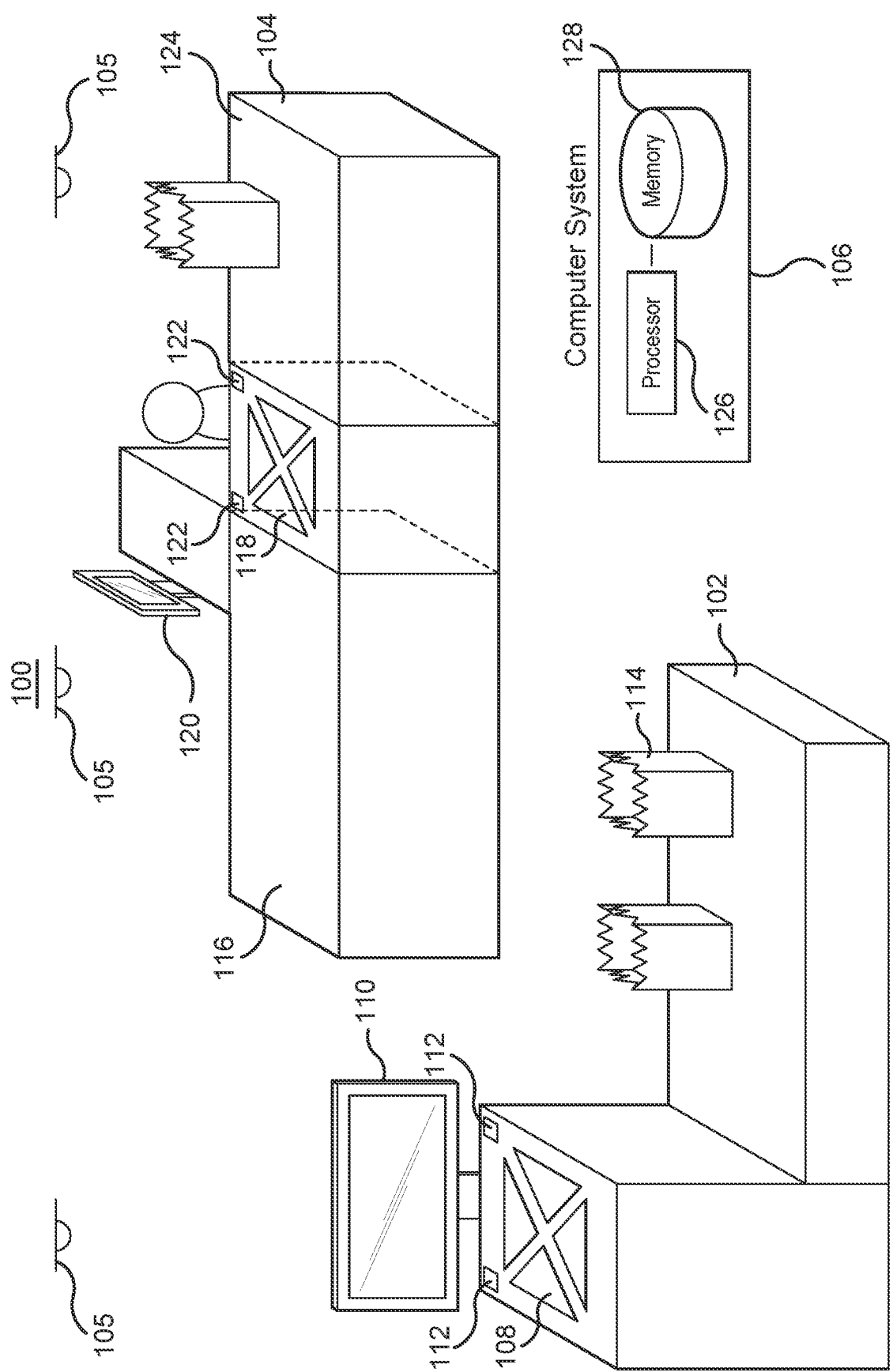
FIG. 1 illustrates an example system.

FIG. 1 illustrates an example system 100. Generally, the system 100 may be the checkout area of a store. Users may scan items in the checkout area to add the items to a transaction. For example, each item may be accompanied by a barcode that can be scanned to identify the item. The item may then be added to a transaction. As see in FIG. 1, the system 100 includes a checkout system 102, a checkout system 104, a computer system 106, and cameras 105.

The checkout system 102 may be a self-checkout system. A user may bring items to the checkout system 102 to scan and purchase the items. As seen in FIG. 1, the checkout system 102 includes a scanner 108, a display 110, one or more cameras 112, and a bagging area 114. Generally, a user may scan the barcode on an item using the scanner 108. The checkout system 102 may then identify the item based on the scanned barcode and add the item to the transaction. The display 110 may indicate the item that is added to the transaction. The user may then place the item into the bagging area 114. In some instances, the cameras 112 may capture an image or video of the item as the item is being scanned.

The checkout system 104 may be an assisted checkout system, where a clerk or associate may scan items for a user. As seen in FIG. 1, the checkout system 104 includes a conveyor 116, a scanner 118, a display 120, one or more cameras 122, and a bagging area 124. A user may place items on the conveyor 116, and the conveyor 116 may move the items toward the scanner 118. The clerk or associate may use the scanner 118 to scan barcodes on the items. The checkout system 104 may identify the items based on the scanned barcodes and add the items to a transaction. The display 120 may display the items that have been added to the transaction. The clerk or associate may then place the items into the bagging area 124. The cameras 122 may capture an image or video of the items as they are scanned by the scanner 118.

The cameras 105 may be positioned throughout the system 100. For example, the cameras 105 may be positioned on a ceiling of a store. The cameras 105 may be directed at the checkout systems 102 and 104. For example, the cameras 105 may be directed at the scanner 108 or the clerk or associate at the checkout system 104. Generally, the cameras 105 capture a video of a user (e.g., a shopper, a clerk, or associate) scanning the barcodes of items using the scanners 108 and 118. The videos may show the movements of the user as the user scans the barcodes of items.

When a barcode is damaged or obfuscated, the scanner 108 or 118 may fail to scan the barcode correctly. For example, if the barcode is scratched, cut, covered, folded, etc., the scanner 108 or 118 may be unable to scan the barcode and identify the item. When the barcode fails to scan correctly, the user may perform certain movements that indicate that the barcode scanned incorrectly. For example, the user may repeatedly attempt to scan and rescan the barcode using the scanner 108 or 118. As another example, the user may begin turning the item around in the user's hand to look for another barcode. The cameras 105 may capture a video that shows these types of movements.

The computer system 106 may determine when a barcode has scanned incorrectly to trigger an item identification process. Generally, the computer system 106 may analyze videos from the cameras 105 to determine when a barcode has scanned incorrectly. Upon determining that the barcode is scanned incorrectly, the computer system 106 may then trigger the item identification process. The computer system 106 may be integrated with or separate from the checkout systems 102 and 104. The computer system 106 may be in communication with the checkout systems 102 and 104 and with the cameras 105. As seen in FIG. 1, the computer system 106 includes a processor 126 and a memory 128 that are arranged to perform the functions or actions of the computer system 106 described herein.

The processor 126 is any electronic circuitry, including, but not limited to one or a combination of microprocessors, microcontrollers, application specific integrated circuits (ASIC), application specific instruction set processor (ASIP), and/or state machines, that communicatively couples to the memory 128 and controls the operation of the computer system 106. The processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 126 may include other hardware that operates software to control and process information. The processor 126 executes software stored on the memory 128 to perform any of the functions described herein. The processor 126 controls the operation and administration of the computer system 106 by processing information (e.g., information received from the checkout system 102 or 104, cameras 105, and memory 128). The processor 126 is not limited to a single processing device and may encompass multiple processing devices contained in the same device or computer or distributed across multiple devices or computers. The processor 126 is considered to perform a set of functions or actions if the multiple processing devices collectively perform the set of functions or actions, even if different processing devices perform different functions or actions in the set.

The memory 128 may store, either permanently or temporarily, data, operational software, or other information for the processor 126. The memory 128 may include any one or a combination of volatile or non-volatile local or remote devices suitable for storing information. For example, the memory 128 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 128, a disk, a CD, or a flash drive. In particular embodiments, the software may include an application executable by the processor 126 to perform one or more of the functions described herein. The memory 128 is not limited to a single memory and may encompass multiple memories contained in the same device or computer or distributed across multiple devices or computers. The memory 128 is considered to store a set of data, operational software, or information if the multiple memories collectively store the set of data, operational software, or information, even if different memories store different portions of the data, operational software, or information in the set.

The computer system 106 may analyze video from the cameras 105, to determine if a barcode is not scanning or is scanning incorrectly. For example, the computer system 106 may use computer vision to analyze a video to determine if a user in the video is making certain types of motions or movements. These motions or movements may include the user repeatedly scanning an item using a scanner 108 or 118 or turning the item over in the user's hands. When the computer system 106 detects these motions or movements in the video, the computer system 106 may determine that a barcode on the item is not scanning or is scanning incorrectly.

In some embodiments, the computer system 106 may consider other indicators that the barcode is scanning incorrectly. For example, the computer system 106 may use a timeout as further indication that a barcode is scanned incorrectly. The computer system 106 may start running a timer when an item is scanned using a scanner 108 or 118. The timer may be set at a timeout value and may count down from the timeout value. When the timer expires, the timeout has occurred. If another item has not been scanned before the timer expires, the computer system 106 may consider the timeout having occurred as a further indication that a barcode is scanning incorrectly. As another example, the computer system 106 may consider or analyze images from a checkout system 102 or 104 as further indication that a barcode may be scanning incorrectly. The scanner 108 or 118 or the cameras 112 or 122 may capture an image of the barcode on the item as the user attempts to scan the barcode on the item. The computer system 106 may analyze the image to determine if the barcode is damaged or obfuscated. If the computer system 106 determines that the barcode in the image is damaged or obfuscated, then the computer system 106 may consider that image as further indication that the barcode is scanning incorrectly.

The computer system 106 may trigger an item identification process in response to determining that the barcode scanned incorrectly. Generally, during the item identification process, the computer system 106 may use computer vision techniques to identify an item using an image of the item. For example, when the computer system 106 determines that a barcode on an item has scanned incorrectly, the computer system 106 may activate the item identification process. The computer system 106 may activate the cameras 112 or 122 in the checkout system 102 or 104. The cameras 112 or 122 may then capture an image or video of the item as the item is moved across the scanners 108 or 118. The computer system 106 may analyze the image or video of the item using computer vision techniques to identify the item. For example, the computer system 106 may compare the image against a database of images to find a closest match. As another example, the computer system 106 may convert the image of the item into a vector and then compare the vector with a database of vectors to find the closest match. The computer system 106 may determine the closest match as the identity of the item that is being scanned. The computer system 106 may then add the identified item to the transaction and indicate to the user that the item has been scanned and added to the transaction. After the item has been identified, the computer system 106 may deactivate the item identification process. For example, after the item has been identified, the computer system 106 may deactivate the cameras 112 or 122 in the checkout system 102 or 104, which conserves computing resources and electrical power.

In this manner, the computer system 106 may automatically identify an item when the barcode on the item is damaged or obfuscated. Additionally, the computer system 106 may determine when a barcode is being scanned incorrectly to trigger the item identification process. Thus, the item identification process may be triggered only when a barcode is being scanned incorrectly, which conserves computing resources and reduces power consumption, in certain embodiments. Moreover, the computer system 106 may reduce delays caused by damaged or obfuscated barcodes.

Figure 2:
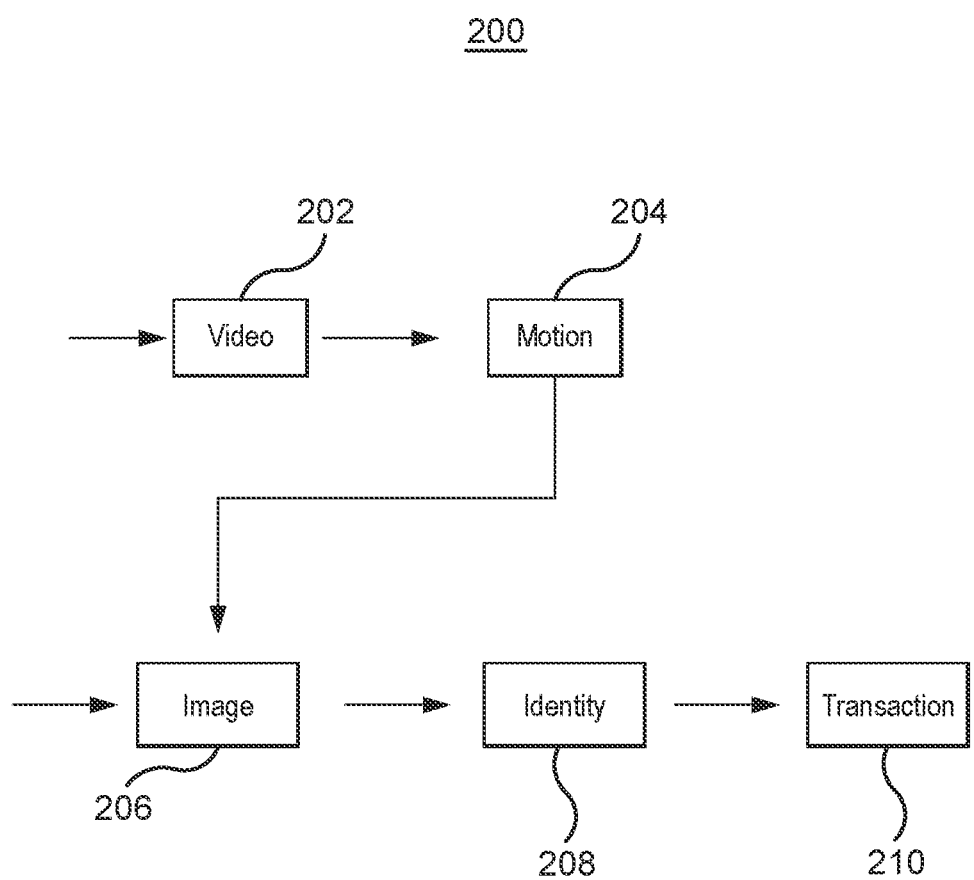
FIG. 2 illustrates an example operation for scanning and identifying an item performed by the system of FIG. 1.

FIG. 2 illustrates an example operation 200 performed by the system 100 of FIG. 1. Generally, the computer system 106 may perform the operation 200. By performing the operation 200, the computer system 106 identifies an item that has a damaged or obfuscated barcode.

The computer system 106 may receive a video 202 from a camera 105 in the system 100. The video 202 may show a user attempting to scan the barcode of an item using the scanner 108 or 118. The computer system 106 may use computer vision techniques to analyze the video 202 to detect a motion 204 made by the user in the video 202. The motion 204 may indicate that the user is experiencing difficulty getting the barcode on the item to scan correctly. For example, the motion 204 may be the user repeatedly moving the item over the scanner 108 or 118. As another example, the motion 204 may be the user turning over the item in the user's hands (e.g., to locate another barcode). When the computer system 106 detects the motion 204 in the video 202, the computer system 106 may determine that the barcode on the item is scanning incorrectly.

Upon detecting the motion 204 that indicates that the barcode is scanning incorrectly, the computer system 106 activates the item identification process. The computer system 106 may activate the cameras 112 or 122, and the cameras 112 or 122 may capture an image 206 of the item as the item is moved across the scanner 108 or 118. The computer system 106 may use computer vision techniques to analyze the image 206 to determine an identity 208 of the item. For example, the computer system 106 may compare the image 206 against a database of images of items to find a closest match. As another example, the computer system 106 may convert the image 206 into a vector that includes a numerical representation of the image 206. The computer system 106 may then compare the vector to a database of vectors for items to identify a closest match. The computer system 106 may determine the identity 208 of the item as the closest match in the database.

After identifying the item in the image 206, the computer system 106 may add the item to a transaction 210. For example, the computer system 106 may include the name of the item and a price for the item in the transaction 210. In this manner, the computer system 106 may allow the transaction 210 to proceed quickly, even though the barcode on the item scanned incorrectly. As a result the computer system 106 reduces delays caused by damaged or obfuscated barcodes on items.

Figure 3:
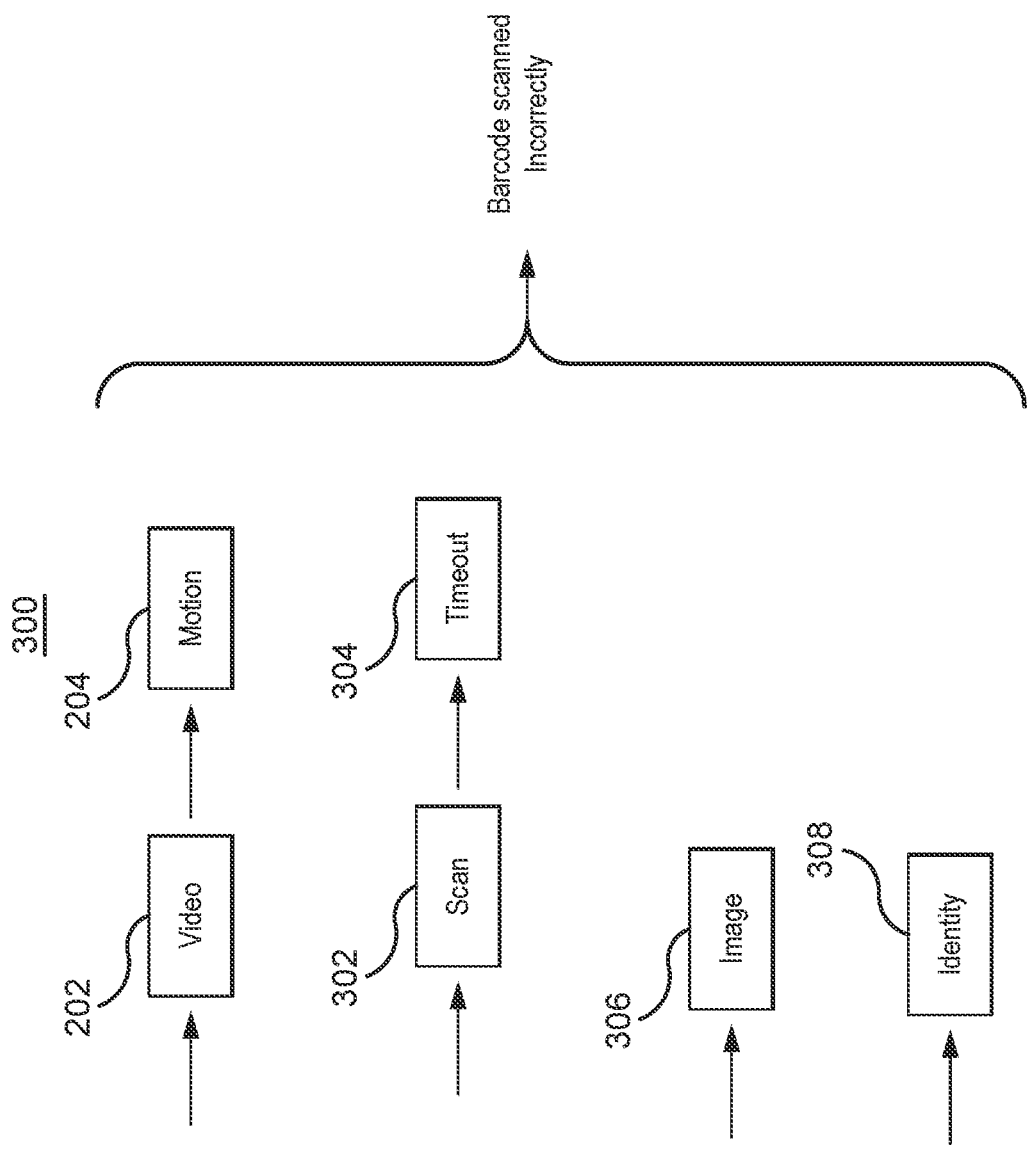
FIG. 3 illustrates an example operation for determining an incorrect barcode scan performed by the system of FIG. 1.

FIG. 3 illustrates an example operation 300 performed by the system 100 of FIG. 1. Generally, the computer system 106 performs the operation 300. By performing the operation 300, the computer system 106 determines when a barcode on an item has scanned incorrectly.

The computer system 106 may receive the video 202 from the cameras 105 and the system 100. The video 202 may show a user attempting to scan the barcode of an item using the scanner 108 or 118. The computer system 106 may use computer vision techniques to detect a motion 204 of the user in the video 202. The motion 204 may indicate that the user is experiencing difficulty getting the barcode on the item to scan correctly. For example, the motion 204 may be the user repeatedly moving the item over the scanner 108 or 118. As another example, the motion 204 may be the user turning the item over in the user's hands. The computer system 106 may determine from the motion 204 that the barcode is scanning incorrectly.

The computer system 106 may consider other indicators, when determining whether the barcode is scanning incorrectly. For example, the computer system 106 may receive a scan 302 of an item. The scan 302 may have been a scan 302 of a previous item (e.g., an item previous to the item that has the damaged or obfuscated barcode). When the computer system 106 receives the scan 302, the computer system 106 may start a countdown timer that is set at a timeout value. The computer system 106 may reset the timer when the barcode on an item is scanned correctly. Due to the barcode on the item scanning incorrectly, the timer may continue to run until a timeout 304 occurs. When the computer system 106 detects that the timeout 304 has occurred, the computer system 106 may consider the timeout 304 as further indication that the barcode on the item scanned incorrectly. Stated differently, when too much time has elapsed since a barcode was scanned correctly, the computer system 106 may treat that timeout as further indication that a barcode has been scanned incorrectly.

As another example, the computer system 106 may receive an image 306 of the barcode that the user is attempting to scan. The image 306 may be captured by the scanner 108 or 118 or the cameras 112 or 122. For example, the scanners 108 or 118 may be optical scanners that capture the image 306 of the barcode. The computer system 106 may analyze the image 306 using computer vision techniques to determine whether the barcode in the image 306 is damaged or obfuscated. For example, the computer system 106 may determine that the barcode in the image 306 is cut, covered, folded, scratched, etc. In response, the computer system 106 may treat the image 306 as further indication that the barcode scanned incorrectly.

In some embodiments, the computer system 106 considers an identity 308 of the user that is attempting to scan the barcode when determining whether the barcode scanned incorrectly. For the checkout system 102, the computer system 106 may determine the identity 308 of the user when the user presents or scans a tag (e.g., a loyalty tag) that identifies the user. For the checkout system 104, the computer system 106 may determine the identity 308 of the user as the clerk or associate assisting at checkout. The computer system 106 may then retrieve and consider information about the identified user when determining whether the barcode scanned incorrectly. For example, the computer system 106 may consider whether the user has a history of incorrectly scanned barcodes. As another example, the computer system may consider whether the user has a habit of turning items over in the user's hands. If so, the computer system 106 may ignore the motion 204 that shows the user turning the item over in the user's hands when determining whether the barcode is scanned incorrectly. In this manner, the computer system 106 may personalize the process of determining whether the barcode scanned incorrectly.

In some embodiments, the computer system 106 uses artificial intelligence to determine the habits, tendencies, and history of the user. For example, the computer system 106 may use computer vision to analyze the video 202 of the user. The computer system 106 may also use a neural network to track the motions 204 of the user over time to learn the behaviors and tendencies of the user. The neural network may learn how the user moves when the user repeatedly scans an item using the scanner 108 or 118. The neural network may learn how the user moves when the user turns an item over in the user's hands. The neural network may learn that the user has a tendency to turn items over in the user's hands even when the barcode on the item scanned correctly. The computer system 106 may consider the behaviors and tendencies of the user when determining whether the motion 204 is indicative of the barcode on an item being scanned incorrectly. The computer system 106 may use the neural network to learn any type of information about the user. For example, the neural network may learn the height of the user, the positioning of the user (e.g., the user's hands) when scanning items, how quickly the user scans items, etc. The computer system 106 may link the information learned by the neural network to the identity 308 of the user. The computer system 106 may then store the identity 308 along with the linked information in a database for future reference.

Figure 4:
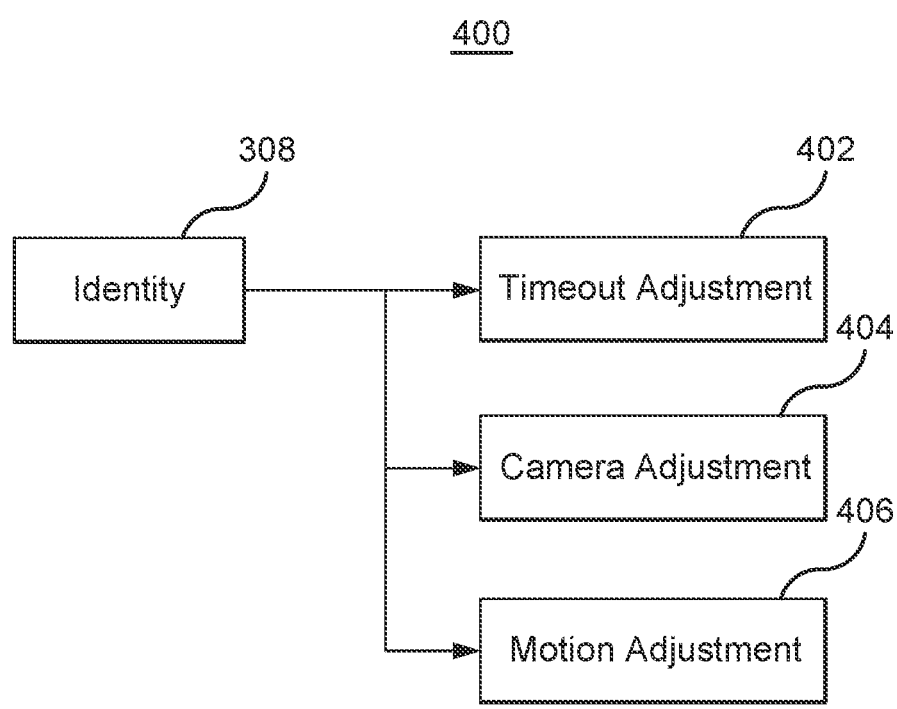
FIG. 4 illustrates an example operation for adjusting system components performed by the system of FIG. 1.

FIG. 4 illustrates an example operation 400 performed by the system 100 of FIG. 1. Generally, the computer system 106 performs the operation 400. By performing the operation 400, the computer system 106 adjusts various components in the system 100.

The computer system 106 may determine the identity 308 of a user in the system 100. As discussed previously, the computer system 106 may determine the identity 308 of a user based on a tag scanned by the user. As another example, the computer system 106 may determine the identity 308 of a clerk or associate at the checkout system 104.

The computer system 106 may adjust various components of the system 100 based on the identity 308 of the user. For example, the computer system 106 may determine, from the identity 308, that the user scans items quickly or slowly. In response, the computer system 106 may make a timeout adjustment 402 that adjusts the timeout 304 for the user. The timeout 304 may be a time threshold between scans of items. If the user takes more time to scan an item than the timeout allows, then the computer system 106 may treat the timeout as an indication that a barcode was scanned incorrectly.

As another example, the computer system 106 may determine, from the identity 308, a height of the user or where the user positions the user's hands when scanning items. The computer system 106 may then make a camera adjustment 404 for the user. For example, the computer system 106 may adjust one or more cameras 105 in the system 100 to direct the cameras 105 at the user. The computer system 106 may direct a camera 105 towards where the user positions the user's hands when scanning items. As a result, the camera 105 may be better directed to capture the video 202 that may show the motion 204 that indicates whether a barcode was scanned correctly or incorrectly.

As another example, the computer system 106 may determine, from the identity 308, that the user tends to make certain motions even if a barcode scanned correctly. For example, the computer system 106 may determine that a user tends to turn items over in the user's hands even when a barcode scanned correctly. In response, the computer system 106 may make a motion adjustment 406 based on the identity 308 of the user. The motion adjustment 406 may cause the computer system 106 to ignore certain motions of the user that the computer system 106 may otherwise treat as indicators of a barcode being scanned incorrectly. For example, the computer system 106 may ignore the user turning an item over in the user's hands as an indicator of a barcode being scanned incorrectly if the computer system 106 determines that the user has a tendency to turn items over in the user's hands even when the barcode scanned correctly.

Figure 5:
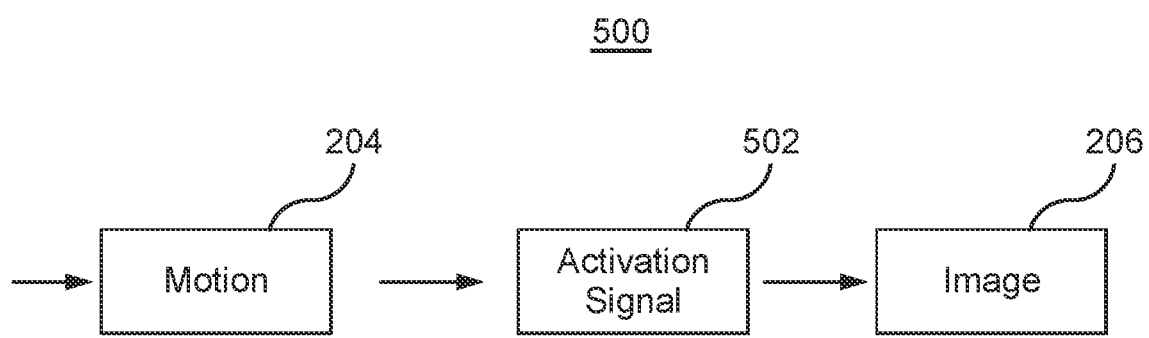
FIG. 5 illustrates an example operation for activating an item identification system performed by the system of FIG. 1.

FIG. 5 illustrates an example operation 500 performed by the system 100 of FIG. 1. Generally, the computer system 106 performs the operation 500. By performing the operation 500, the computer system 106 activates an item identification process.

The computer system 106 detects the motion 204 in the video 202. The motion 204 may indicate that a barcode is being scanned incorrectly. For example, the motion 204 may be a user repeatedly moving an item over the scanner 108 or 118. As another example, the motion 204 may be a user turning an item over in the user's hands. In response to determining that the barcode is being scanned incorrectly, the computer system 106 may generate and communicate an activation signal 502 to other components in the system 100. For example, the computer system 106 may communicate the activation signal 502 to the checkout system 102 or 104. The activation signal 502 may activate the cameras 112 or 122 at the checkout system 102 or 104. When the cameras 112 or 122 are activated, the cameras 112 or 122 may capture the image 206 of the item when the item is being moved over the scanner 108 or 118. The computer system 106 may use the image 206 to identify the item.

Figure 6:
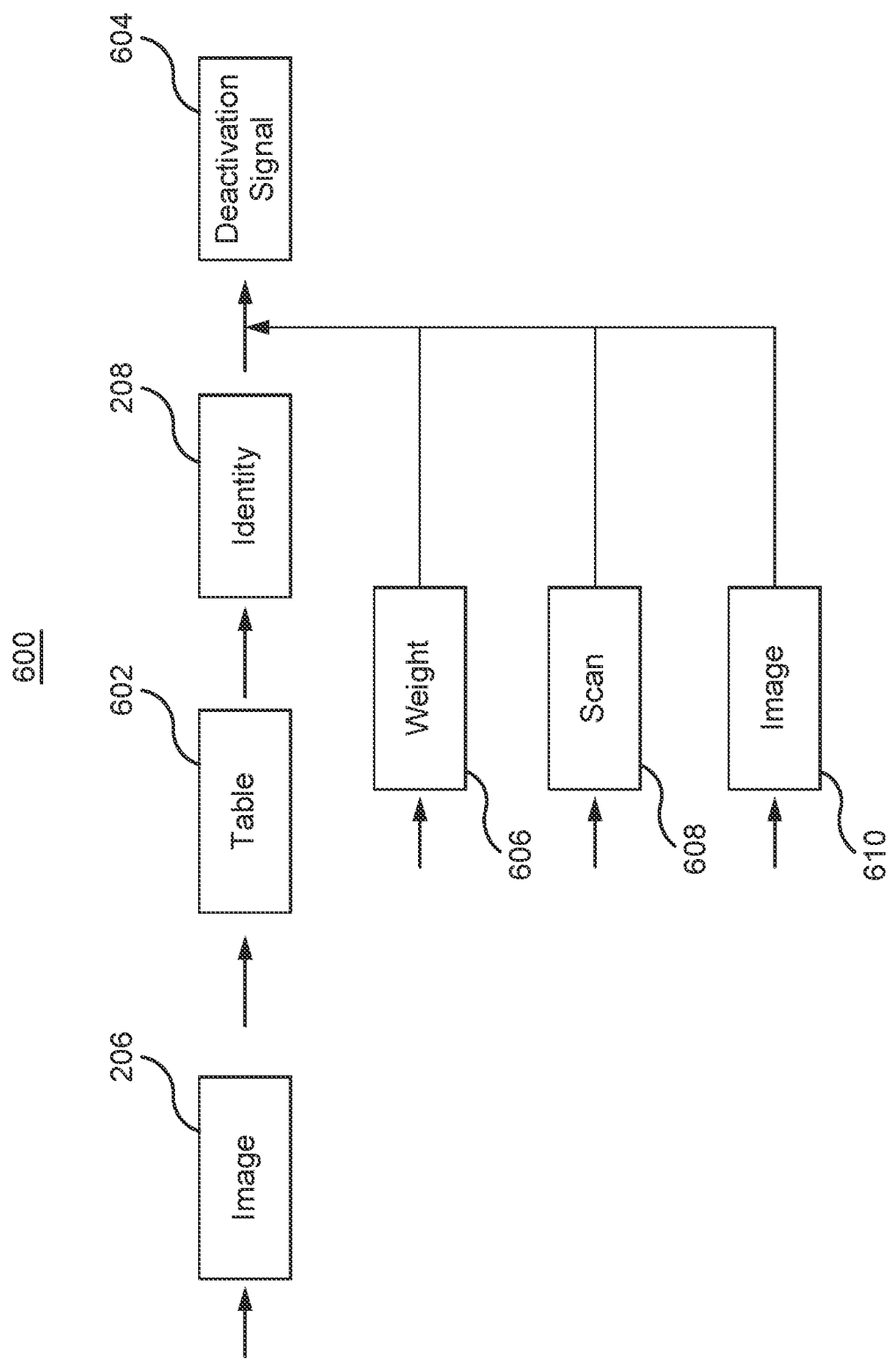
FIG. 6 illustrates an example operation for identifying an item performed by the system of FIG. 1.

FIG. 6 illustrates an example operation 600 performed by the system 100 of FIG. 1. Generally, the computer system 106 performs the operation 600. By performing the operation 600, the computer system 106 identifies an item.

The computer system 106 receives the image 206 of an item. The image 206 may have been captured by the cameras 112 or 122 of the checkout system 102 or 104 after the computer system 106 activated the item identification process. The image 206 may be a frame of a video of the item. The computer system 106 may use the image 206 to reference into a table 602 of items. For example, the table 602 may store images of items, and the computer system 106 may compare the image 206 with the images in the table 602 to determine a closest match. As another example, the computer system 106 may convert the image 206 into a vector that includes a numerical representation of the image 205. The table 602 may store vectors for items. The computer system 106 may compare the vector generated for the image 206 with the vectors in the table 602 to determine a closest match. The computer system 106 may then determine the identity 208 of the item as the closest match from the table 602.

After the computer system 106 has determined the identity 208 of the item, the computer system 106 generates and communicates a deactivation signal 604 to the checkout system 102 or 104. The deactivation signal 604 may deactivate the cameras 112 or 122 at the checkout system 102 or 104. By deactivating the cameras 112 or 122, the cameras 112 or 122 may stop capturing images or videos of items, which conserves computing resources and electric power consumption.

In some embodiments, the computer system 106 may request feedback from the user to confirm the determined identity 208 of the item. For example, the computer system 106 may determine one or more options for the identity 208 of the item from the table 602. The computer system 106 may present these one or more options to the user (e.g., on the display 110 or 120). The user may view the display 110 or 120 and confirm one of the options as the identity 208 of the item being scanned. The computer system 106 may confirm the identity 208 of the item based on the user's confirmation.

In some embodiments, the computer system 106 generates and communicates the deactivation signal 604 based on other factors. For example, the computer system 106 may determine a weight 606 of items in the bagging area 114 or 124. The weight 606 increasing may indicate that the user placed the item into the bagging area 114 or 124, which may indicate that the identity 208 of the item is correct. The computer system 106 may generate and communicate the deactivation signal 604 based on the weight 606 increasing.

As another example, the computer system 106 may receive a scan 608 of another item. The computer system 106 may determine that the user scanned another item because the identity 208 of the previous item was correct. The computer system 106 may generate and communicate the deactivation signal 604 based on the scan 608.

As another example, the computer system 106 may receive an image 610 of another item. The image 610 may be captured as the user moves the new item over the scanner 108 or 118. The computer system 106 may determine, from the image 610, that the user is scanning another item because the identity 208 of the previous item was correct. The computer system 106 may generate and communicate the deactivation signal 604, in response to receiving the image 610.

Figure 7:
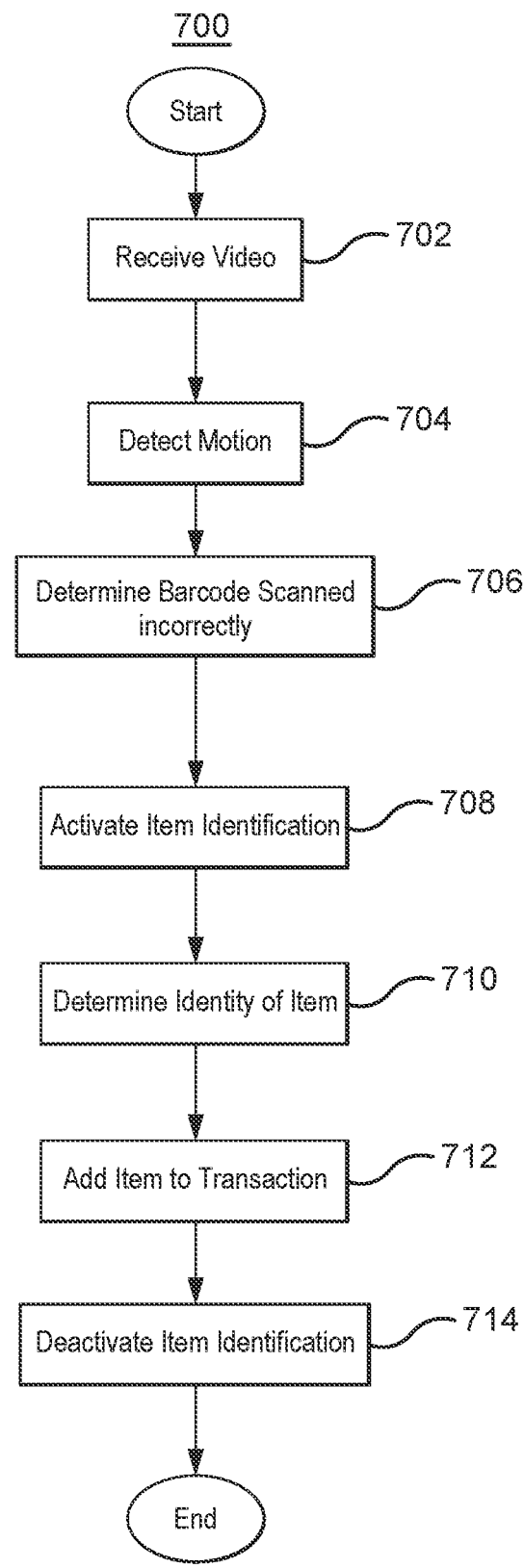
FIG. 7 is a flowchart of an example method scanning and identifying an item performed by the system of FIG. 1.

FIG. 7 is a flowchart of example method 700 performed by the system 100 of FIG. 1. In particular embodiments, the computer system 106 performs the method 700. By performing the method 700, the computer system 106 triggers and uses an item identification process, when the computer system 106 determines that a barcode on an item scanned incorrectly.

In block 702, the computer system 106 receives the video 202. The video 202 may have been captured by a camera 105 in the system 100. The video 202 may show a user at the checkout system 102 or 104 scanning an item. In block 704, the computer system 106 may detect a motion 204 in the video 202. The computer system 106 may use computer vision techniques to analyze the video 202 to detect the motion 204. The motion 204 may be a movement of the user in the video 202.

In block 706, the computer system 106 determines that a barcode scanned incorrectly. The computer system 106 may analyze the motion 204 to determine whether the barcode is scanned incorrectly. For example, if the motion 204 shows the user repeatedly moving the item over the scanner 108 or 118, then the computer system 106 may determine that the barcode scanned incorrectly. As another example, if the motion 204 is the user turning the item over in the user's hands, then the computer system 106 may determine that the barcode scanned incorrectly.

In block 708, the computer system 106 activates an item identification process in response to the computer system 106 determining that the barcode scanned incorrectly. For example, the computer system 106 may generate and communicate an activation signal 502 to the checkout system 102 or 104. The activation signal 502 may cause the cameras 112 or 122 to activate. The cameras 112 or 122 may then capture an image or video of the item.

In block 710, the computer system 106 determines the identity 208 of the item. The computer system 106 may compare the image 206 from the cameras 112 or 122 to a database of images of items to determine a closest match. As another example the computer system 106 may convert the image 206 from the cameras 112 or 122 into a vector. The computer system 106 may then compare the vector to a database of vectors for items to determine the closest match. The computer system 106 may determine the closest match from the database to be the identity 208 of the item. In block 712, the computer system 106 adds the identified item to the transaction 210. For example, the computer system 106 may add the name of the item and the price of the item to the transaction 210.

In block 714, the computer system 106 deactivates the item identification process. For example, the computer system 106 may communicate the deactivation signal 604 to the checkout system 102 or 104. The deactivation signal 604 may cause the cameras 112 or 122 to stop capturing images or videos of items. As a result, the computer system 106 conserves computing resources and power consumption.

In summary, the system 100 detects when a barcode scanned incorrectly and triggers an item identification system or process. The system 100 may monitor video (e.g., using a computer vision technique) to detect when a user performs motions that indicate a barcode is scanning incorrectly. For example, the system 100 may detect when the user has attempted to scan the same item repeatedly or when the user has turned an item over repeatedly. The system 100 may then activate the item identification system or process. For example, the system may activate secondary cameras that capture images of the item. The system may analyze these images to identify the item. After the item is identified, the system may add the item to the transaction and deactivate the item identification system or process.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure describes a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A computer system comprising:
a memory; and
a processor communicatively coupled to the memory, the processor configured to:
detect, based on a video of a user captured by a camera, a motion of the user while scanning a barcode of an item;
determine an identity of the user;
adjust, based on the identity of the user, the camera;
in response to determining, based on the motion of the user and the identity of the user, that the barcode scanned incorrectly, capture an image of the item;
determine, based on the image of the item, an identity of the item; and
add, based on the identity of the item, the item to a checkout transaction.

2. The computer system of claim 1, wherein the motion of the user indicates the user attempting to scan the barcode multiple times.

3. The computer system of claim 1, wherein the motion of the user indicates the user turning the item over.

4. The computer system of claim 1, wherein the processor is further configured to determine that a timeout has occurred since a scan of a previous item, and wherein determining that the barcode scanned incorrectly is further based on the timeout having occurred.

5. The computer system of claim 1, wherein the processor is further configured to determine, based on an image of the barcode, that the barcode is damaged, and wherein determining that the barcode scanned incorrectly is further based on determining that the barcode being damaged.

6. The computer system of claim 1, wherein the processor is further configured to adjust a timeout based on the identity of the user, and wherein determining that the barcode scanned incorrectly is further based on the timeout having occurred.

7. The computer system of claim 1, wherein determining the identity of the item is in response to determining that the barcode scanned incorrectly.

8. The computer system of claim 1, wherein the processor is further configured to activate, in response to determining that the barcode scanned incorrectly, a camera arranged to capture the image of the item.

9. The computer system of claim 8, wherein the processor is further configured to deactivate the camera in response to determining the identity of the item.

10. The computer system of claim 8, wherein the processor is further configured to deactivate the camera in response to determining that a total weight in a bagging area increased.

11. A method comprising:
  detecting, based on a video of a user captured by a camera, a motion of the user while scanning a barcode of an item;
  determining an identity of the user:
  adjusting, based on the identity of the user, the camera;
  in response to determining, based on the motion of the user and the identity of the user, that the barcode scanned incorrectly, capture an image of the item;
  determining, based on the image of the item, an identity of the item; and
  adding, based on the identity of the item, the item to a checkout transaction.

12. The method of claim 11, wherein the motion of the user indicates the user attempting to scan the barcode multiple times.

13. The method of claim 11, wherein the motion of the user indicates the user turning the item over.

14. The method of claim 11, further comprising determining that a timeout has occurred since a scan of a previous item, and wherein determining that the barcode scanned incorrectly is further based on the timeout having occurred.

15. The method of claim 11, further comprising determining, based on an image of the barcode, that the barcode is damaged, and wherein determining that the barcode scanned incorrectly is further based on the barcode being damaged.

16. The method of claim 11, wherein determining the identity of the item is in response to determining that the barcode scanned incorrectly.

17. A system comprising:
  a first camera arranged to capture a video of a user;
  a scanner;
  a second camera;
  a memory; and
  a processor communicatively coupled to the memory, the processor configured to:
    detect, based on the video, a motion of the user while scanning a barcode of an item using the scanner;
    determine an identity of the user;
    adjust, based on the identity of the user, the first camera;
    in response to determining, based on the motion of the user and the identity of the user, that the barcode scanned incorrectly, activate the second camera to capture an image of the item;
    determine, based on the image of the item, an identity of the item;
    add, based on the identity of the item, the item to a checkout transaction; and
    deactivate the second camera after determining the identity of the item.

* * * * *